United States Patent

[11] 3,537,586

| [72] | Inventor | Ernst J. Hunkeler<br>Fairport, New York |
|---|---|---|
| [21] | Appl. No. | 747,770 |
| [22] | Filed | July 15, 1968 |
| [45] | Patented | Nov. 3, 1970 |
| [73] | Assignee | The Gleason Works<br>Rochester, New York<br>a corporation of New York |

[54] MAGNETIC SEPARATOR
10 Claims, 4 Drawing Figs.

[52] U.S. Cl. .................................................... 210/222
[51] Int. Cl. .................................................... B01d 35/06
[50] Field of Search .......................................... 210/222,
223, 407, 408; 209/212, 213, 223, 478

[56] References Cited
UNITED STATES PATENTS
2,564,593  8/1951  Caldwell...................... 210/222

3,351,203  11/1967  Robb............................ 210/222X
FOREIGN PATENTS
1,120,481  7/1968  Great Britain................ 210/222

*Primary Examiner*—Reuben Friedman
*Assistant Examiner*—T. A. Granger
*Attorney*—Cushman, Darby and Cushman ABSTRACT: Magnets carried by an endless chain traverse one face of a stationary upright nonmagnetic barrier plate, drawing cutting chips upwardly, along the opposite face of the plate, from a sump for cutting liquid in a machine tool. The chips are brought into the sump and directed against the surface of the plate by a screw conveyor and an agitator. A baffle near the top of the plate prevents chips from being drawn back into the sump by descending magnets, the chips dropping from the baffle into a basket. The magnets ascend in an inclined path so that drainage from ascending chips drawn by one magnet will bypass chips being drawn by following magnets.

Patented Nov. 3, 1970

INVENTOR.
ERNST J. HUNKELER
BY Cushman, Darby & Cushman
ATTORNEY

MAGNETIC SEPARATOR

The present invention relates to a magnetic separator for removing magnetically attractable particles from a liquid, for example for separating steel chips from cutting liquid in a machine tool.

It has been known heretofore to draw such particles from a body of liquid by means of magnets moving in an endless path, with a thin stationary barrier of nonmagnetic material physically isolating the magnets from the liquid and the particles. The particles after being elevated may be separated from the influence of the magnets by a baffle affixed to the barrier, as distinguished from a scraper which may be required to remove particles from a moving magnet or system of magnets in cases where no such stationary barrier is interposed. The stationary barrier obviates a serious disadvantage of such a scraper, this being that particles passing over and beneath the edge of a scraper are abrasive, causing rapid wear of the scraper and impairment of its scraping action.

The primary purpose of the present invention is to improve the structure and the efficiency of separators of the kind which employ such a stationary nonmagnetic barrier for isolating the magnets from the materials to be separated. A separator according to the invention comprises a plurality of magnets supported for movement in spaced relation to each other in an endless path along one face of nonmagnetic barrier, said path having ascending and descending stretches, a chamber on the opposite face of the barrier, at a lower portion of said path, for the liquid and particles which are to be separated, and a baffle extending outwardly from said opposite face of the barrier, adjacent the upper portion of the path, for preventing particles being drawn back to said chamber by descending magnets and for directing the particles to a receiver therefor disposed below the baffle, the ascending stretch of said path being so inclined to the direction of flow of liquid draining from ascending particles that the drainage from particles being drawn by one ascending magnet will bypass particles being drawn by a following ascending magnet.

The foregoing and other objects and advantages of the invention will appear from the following description of the preferred embodiment shown in the accompanying drawings, wherein.

Figure 1:
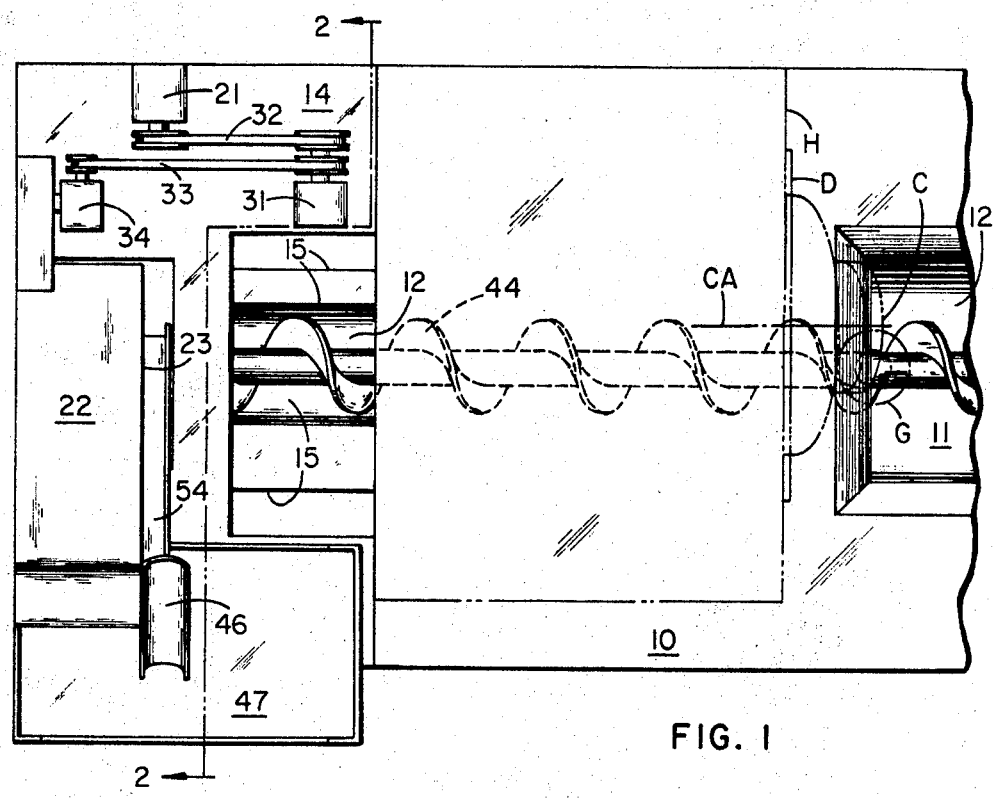
FIG. 1 is a plan view of the frame of a machine tool with the present separator applied thereto.

The frame 10 shown in FIG. 1 is that of a machine tool, in this instance a bevel gear cutting machine, having a well 11 for receiving cutting chips and cutting liquid. The chips result from the cutting of teeth in a work gear or gear blank G by a face mill cutter C whose axis of rotation is designated CA, the cutter being supported by a drum or cradle D rotatable in a housing H mounted on the frame. The liquid is that applied to the cutter C and work gear G as a cooling and lubricating medium. The parts of the machine which actuate the cutter and work gear have no bearing upon the invention and hence are not illustrated. The bottom of the well 11 opens into a substantially horizontal trough 12 which extends through the frame 10 and opens into a somewhat wider and deeper sump 13 in a tank 14 which constitutes a part of the frame. The height of the sidewalls 15 of trough 12 and sump 13 determine the level 16 of liquid in the trough 12. Spillage of liquid over the sidewalls 15 is into the main chamber 17 of the tank whose liquid level is indicated at 18. From chamber 17 the liquid is recirculated over the cutter C and work G by a pump 21, FIG. 1, and piping, not shown.

Secured in sump 13 is a liquidtight magnet housing 22 whose wall facing the frame 10 proper consists of a vertically disposed barrier plate 23 of nonmagnetic material, preferably stainless steel. Preferably the entire housing 22 is constructed of such steel. Journaled in bearings 24 and 25 of housing 22 is a shaft 26 to which are secured sprockets 27 and 28. Sprocket 27 is driven, counterclockwise in FIG. 2, from a motor 31 through belt and pulley drives, best shown in FIG. 1, including a belt 32 which drives pump 21, and belt 33 which drives worm and worm wheel reduction unit 34, and thence from the output shaft of unit 34 through sprocket 35 and endless chain 36 which runs over sprocket 27.

Another endless chain, 37, runs (counterclockwise in FIG. 2) over sprocket 28 and a guide provided in the upper portion of housing 22, the guide in this instance being a sprocket 38 mounted for rotation in the housing 22. Permanent magnets 41 are secured to spaced links of the chain, the magnets being disposed between the chain and plate 23, as shown in FIG. 3, and having plane faces 42 adapted to slide on the face of the plate within the housing. Each magnet is preferably so formed that both of its magnetic poles are on its face 42. Counterweights 43 for the magnets may be secured to the chain links which carry the magnets, to overcome a tendency of the chain to twist under the load of the magnets. The counterweights may be eliminated however when the twisting moments produced by the magnets are so small in relation to the stiffness of the chain that the faces 42 of the magnets remain substantially in contact with the inner surface of plate 23 as they travel therealong.

Figure 3:
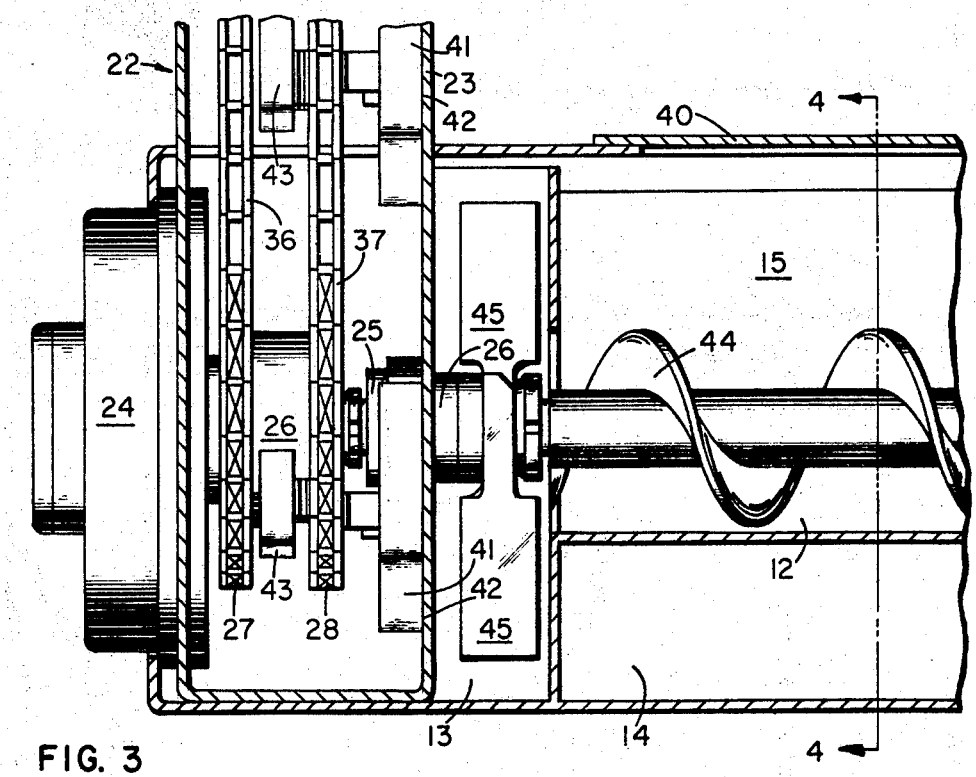
FIG. 3 is a detail sectional view in plane 3-3 of FIG. 2.
Figure 4:
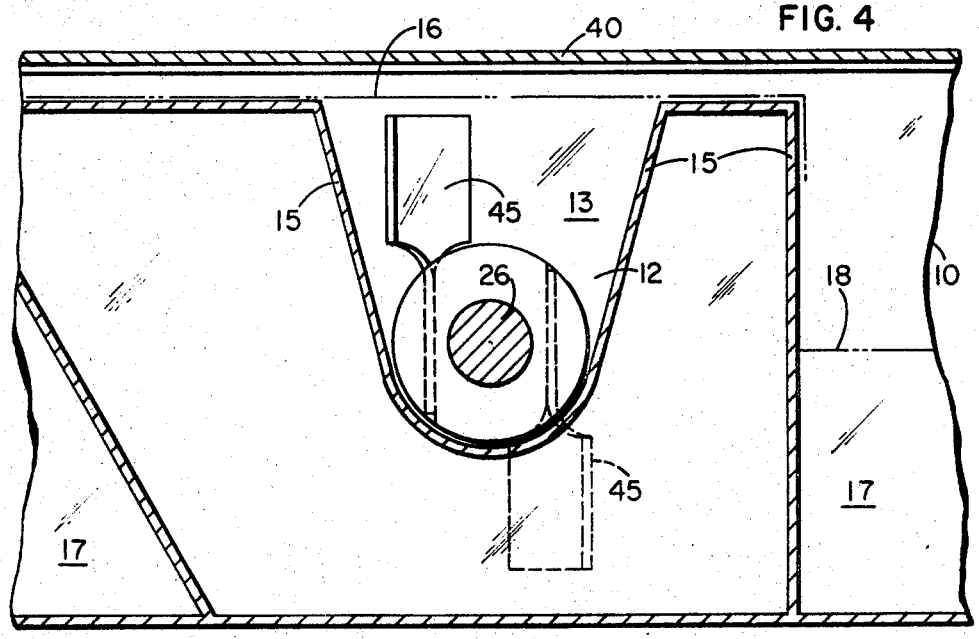
FIG. 4 is a detail vertical sectional view in plane 4-4 of FIG. 3.

A chip conveyor screw 44 extends along the trough 12 and is connected to shaft 26 in axially aligned relation for rotation in unison therewith, to carry cutting chips from well 11 to chamber 13. Above the left end of the screw 44 there is an access opening closed by a removable cover 40 shown in FIGS. 3 and 4 but removed and hence not shown in FIG. 1. An impeller type agitator comprising opposed blades 45 is secured to the shaft 26 within the sump 13. The blades shown are pitched to direct chips against the outer face of plate 23 whose opposite inner face is traversed by the magnets 41. The diameter of sprocket 28 in relation to the spacing of the magnets along chain 37, and the phase relation of blades 45 to the magnets, is preferably such that each blade acts to propel the chips against the particular portion of the plate that a magnet is approaching. The blades act to stir the mixture of chips and liquid in the sump, thereby increasing the exposure of the chips to the fields of the magnets. In instances where the chip formation or chip density is such that chips tend to pack between the blades and plate 23, the blades are advantageously made of reduced pitch so that they become essentially stirring rods rather than impellers.

Figure 2:
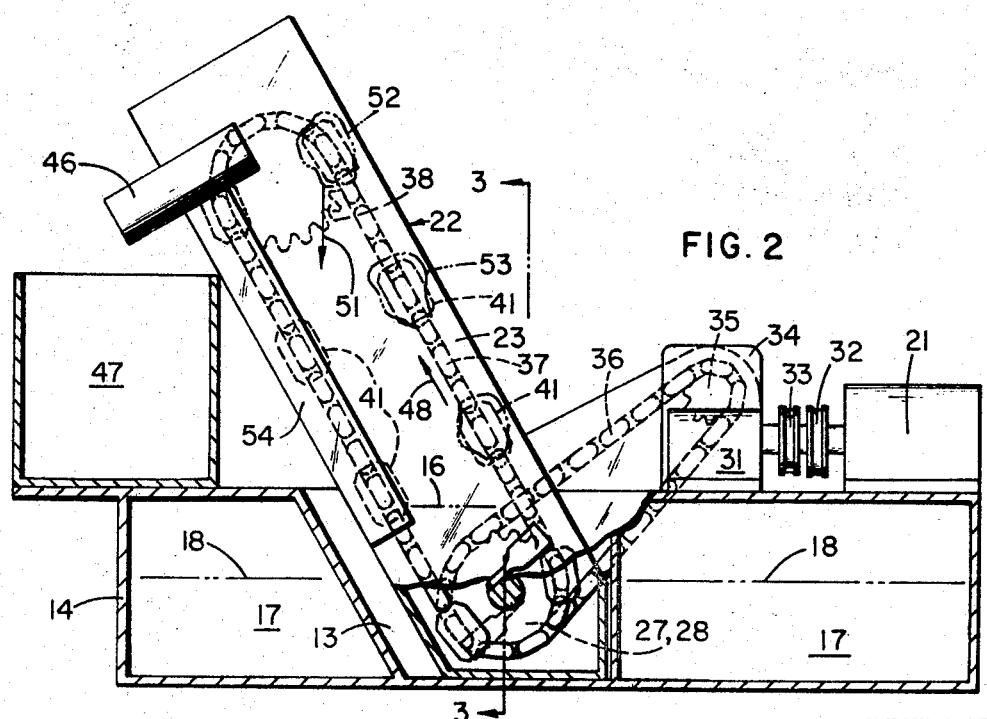
FIG. 2 is a vertical sectional view, in plane 2-2 of FIG. 1.

Chips attracted from the liquid in sump 13 by the magnets are drawn upwardly along the outer face of barrier plate 23 and are removed from the upper portion of plate 23 by a troughlike baffle 46, preferably also made of nonmagnetic stainless steel, which is secured to and extends outwardly from the plate, i.e. toward the viewer in FIG. 2, and also extends laterally so as to overlie a removable basket 47 into which the chips drop from the baffle. As shown, the laterally extending portion of the baffle is inclined downwardly to facilitate flow of the chips toward the basket.

As best shown in FIG. 2 the ascending path of the magnets, represented by arrow 48, is inclined to the vertical by an acute angle such that liquid draining downwardly in the direction of arrow 51 from a clump of chips, such as indicated at 52, that is being drawn upwardly by one magnet; will bypass a similar clump 53 being elevated by a following magnet. Because of this a substantial amount of liquid is recovered from the chips after they have been lifted from the liquid in chamber 13, the draining liquid being collected and conducted back to chamber 13 by a chute 54 secured to the edge of the plate 23 that is adjacent the descending path of the magnets. In order to allow time for adequate drainage, the magnets preferably are operated at a relatively low speed. The speed reduction from motor 31 is provided by the belt and pulley drives 32, 33, the speed reducer 34, and the chain and sprocket drive 35, 36, 27, resulting in a linear speed of the magnets of approximately five feet per minute in the particular apparatus that is illustrated.

It will be understood that the foregoing description and drawings are presented only by the way of illustration and example of a preferred embodiment of the invention, and not by way of limitation.

I claim:

1. In a magnetic separator for removing magnetically attractable particles from a liquid, for example for separating steel chips from cutting liquid in a machine tool, said separator including chip-conveying means for directing the liquid and particles to be separated against the lower portion of the outer face of a nonmagnetic barrier, positioned so that liquid passing over said outer face will flow substantially in only one predetermined direction, and a plurality of magnetic elements supported in spaced relation to each other adjacent the inner face of said barrier, the improvement comprising: drive means for interconnecting said magnetic elements and moving them in an endless path adjacent said inner barrier face, said path having stretches ascending from and descending to that portion of the barrier opposite to which said liquid and particles are directed by said chip-conveying means, and said ascending stretches being inclined to said direction of liquid flow over the outer barrier face, whereby the liquid draining from particles being drawn up by one ascending magnetic element will bypass particles being drawn upward along said barrier by a following ascending magnetic element, and baffle means positioned relative to said outer barrier face adjacent said endless path for preventing particles from being drawn back to said chip-conveying means by descending magnetic elements.

2. A separator according to claim 1 wherein said baffle means comprises a troughlike member contacting the outer face of said barrier adjacent the upper end of said descending path.

3. A separator according to claim 1 in which said barrier is positioned in a substantially vertical plane and said endless path is parallel thereto.

4. A separator according to claim 1 further comprising a downwardly inclined chute contacting the outer face of said barrier and extending beneath said ascending path, for returning to said chamber liquid draining from particles elevated by ascending magnetic elements.

5. A separator according to claim 1 wherein said magnetic elements have plane faces adapted to slide on said inner barrier face as they traverse said endless path, and said drive means comprises a chain which runs over upper and lower guides at least one of which is a sprocket, said magnetic elements being secured to spaced links of said chain and confined between the chain and said barrier.

6. A separator according to claim 5 wherein said chip-conveying means includes a chamber for holding said liquid and particles, and a screw below the liquid level of said chamber for conveying metal particles to the latter, said screw being coaxial of and corotatable with said sprocket.

7. A separator according to claim 6 wherein said chip-conveying means further comprises a stirring element in said chamber corotatable with said sprocket.

8. A separator according to claim 7 in which said stirring element comprises an impeller blade arranged to direct the liquid and the particles in the chamber against the lower portion of said barrier.

9. A separator according to claim 5 further comprising counterweight means disposed on the opposite side of the chain from said magnetic elements for maintaining substantial contact between the plane faces of said elements and said barrier.

10. A separator according to claim 1 wherein said baffle means are positioned adjacent the descending stretch of said endless path.